United States Patent
Williams et al.

(10) Patent No.: US 11,598,403 B2
(45) Date of Patent: Mar. 7, 2023

(54) ISOLATION DEVICE WITH SELECTED ANGLE BETWEEN SPRING STOP AND DAMPING MEMBER

(71) Applicant: LITENS AUTOMOTIVE PARTNERSHIP, Woodbridge (CA)

(72) Inventors: Warren J. Williams, Oakville (CA); Marek Frankowski, Innisfil (CA); Jun Xu, Woodbridge (CA)

(73) Assignee: LITENS AUTOMOTIVE PARTNERSHIP, Woodbridge, CA (US)

(*) Notice: Subject to any disclaimer, the term of this patent is extended or adjusted under 35 U.S.C. 154(b) by 597 days.

(21) Appl. No.: 16/499,125

(22) PCT Filed: Mar. 28, 2018

(86) PCT No.: PCT/CA2018/050386
§ 371 (c)(1),
(2) Date: Sep. 27, 2019

(87) PCT Pub. No.: WO2018/176147
PCT Pub. Date: Oct. 4, 2018

(65) Prior Publication Data
US 2021/0088120 A1    Mar. 25, 2021

Related U.S. Application Data
(60) Provisional application No. 62/477,430, filed on Mar. 28, 2017.

(51) Int. Cl.
*F16D 41/20* (2006.01)
*F16H 55/36* (2006.01)
(Continued)

(52) U.S. Cl.
CPC ......... *F16H 55/36* (2013.01); *F16D 41/206* (2013.01); *F16F 15/129* (2013.01); *F16F 15/1216* (2013.01); *F16H 2055/366* (2013.01)

(58) Field of Classification Search
CPC ...... F16H 55/36; F16H 2055/366; F16H 7/20; F16D 41/206; F16F 15/1216; F16F 15/129; B60K 2025/022; B60K 25/02
See application file for complete search history.

(56) References Cited

U.S. PATENT DOCUMENTS 4,473,362 A   9/1984   Thomey et al.
4,689,037 A   8/1987   Bytzek
(Continued)

FOREIGN PATENT DOCUMENTS

CA    2426066 A    10/2003
CN    102472373 A   5/2012
(Continued)

OTHER PUBLICATIONS

Extended European Search Report for EP15840737 dated Nov. 19, 2018.
(Continued)

*Primary Examiner* — David J Hlavka
(74) *Attorney, Agent, or Firm* — Aird & McBurney LP

(57) ABSTRACT

In an aspect, an isolation device is provided for a belt and a component shaft in an engine. The device includes a hub, a pulley, an isolation spring and a damping member that is fixed rotationally relative to the hub and is engageable frictionally with the pulley. Torque transmission through the spring below a selected non-zero torque, irrespective of hub load on the pulley, drives a change in radius of the helical coils of the spring that is sufficiently small that the spring avoids pressing the damping member against the pulley. Torque transmission through the spring above the selected
(Continued)

non-zero torque, irrespective of hub load on the pulley, drives a change in radius of the helical coils that is sufficiently large that the isolation spring applies a radial force to press the damping member against the pulley so as to generate frictional damping.

16 Claims, 9 Drawing Sheets

(51) Int. Cl.
  *F16F 15/121* (2006.01)
  *F16F 15/129* (2006.01)

(56) References Cited

U.S. PATENT DOCUMENTS

| | | | |
|---|---|---|---|
| 4,698,049 | A | 10/1987 | Bytzek et al. |
| 4,725,260 | A | 2/1988 | Komorowski et al. |
| 8,192,312 | B2 | 6/2012 | Mi et al. |
| 2008/0139351 | A1 | 6/2008 | Pflug |
| 2010/0147646 | A1 | 6/2010 | Lannutti et al. |
| 2011/0162938 | A1 | 7/2011 | Antchak et al. |
| 2011/0281678 | A1 | 11/2011 | Cali et al. |
| 2012/0088610 | A1 | 4/2012 | Anto |
| 2013/0098727 | A1 | 4/2013 | Williams et al. |
| 2013/0216524 | A1 | 8/2013 | Antchak et al. |
| 2013/0217524 | A1 | 8/2013 | Antchak et al. |
| 2013/0324335 | A1 | 12/2013 | Chen et al. |
| 2013/0345004 | A1 | 12/2013 | McCrary |
| 2014/0141892 | A1* | 5/2014 | Williams ............ F16D 3/12 464/40 |
| 2014/0305765 | A1 | 10/2014 | Serkh |
| 2015/0285312 | A1 | 10/2015 | Williams et al. |
| 2015/0285365 | A1 | 10/2015 | Michelotti |
| 2016/0223050 | A1 | 8/2016 | Williams et al. |
| 2017/0254366 | A1* | 9/2017 | Antchak ............ F16D 41/206 |
| 2018/0106355 | A1* | 4/2018 | Canto Michelotti . F16D 41/206 |

FOREIGN PATENT DOCUMENTS

| | | |
|---|---|---|
| CN | 103140693 A | 6/2013 |
| CN | 103210226 A | 7/2013 |
| JP | 2008169895 A | 7/2008 |
| JP | 2008267563 A | 11/2008 |
| JP | 2008298290 A | 12/2008 |
| JP | 201252576 A | 3/2012 |
| JP | 2012553711 A | 12/2012 |
| JP | 2013504028 A | 2/2013 |
| JP | 5499172 B2 | 5/2014 |
| WO | WO2000014427 A3 | 10/2000 |
| WO | WO2010037232 A1 | 4/2010 |
| WO | 2011008291 A1 | 1/2011 |
| WO | 2011160215 A1 | 12/2011 |
| WO | WO2012061936 A1 | 5/2012 |
| WO | WO2013192407 A2 | 12/2013 |
| WO | WO2015048885 A1 | 4/2015 |
| WO | 2016037283 A1 | 3/2016 |
| WO | WO2016037283 A1 | 3/2016 |

OTHER PUBLICATIONS

International Search Report and Written Opinion for for PCT/CA2018/050386 dated May 31, 2018.
Office Action for U.S. Appl. No. 15/509,330 dated Apr. 5, 2019.
Office Action for Chinese application No. 2015800484835 dated Jun. 5, 2018.
Office action for U.S. Appl. No. 15/509,330 dated Sep. 4, 2019.
Office Action for IN application No. 201747007731 dated Mar. 3, 2020.
Office Action for JP 2017-513651 dated Jun. 1, 2020.
Office Action for CN201880021708.1 dated Apr. 26, 2021.
Office Action for BR 11 2017 004585 0 dated Jul. 30, 2020.
KR10-2017-7006300, Office Action & English translation thereof, dated Dec. 15, 2021, Korean Intellectual Property Office.
CN201880021708.1, Office Action & English translation thereof, dated Jan. 4, 2022, China National Intellectual Property Administration.

\* cited by examiner

ISOLATION DEVICE WITH SELECTED ANGLE BETWEEN SPRING STOP AND DAMPING MEMBER

CROSS-REFERENCE TO RELATED APPLICATIONS

This application claims priority to U.S. Provisional Patent Application No. 62/477,430 filed Mar. 28, 2017, the contents of which are incorporated herein in their entirety.

FIELD

This disclosure relates to isolation devices such as isolators and decouplers, and in particular to isolation devices that are used on an accessory drive shaft on a vehicular engine where damping of the isolation device is required.

BACKGROUND

Isolation devices such as isolators (with little or no overrunning capability) and decouplers (with overrunning capability via a one-way clutch) are known devices that are installed on accessory drive shafts on vehicular engines for reducing the transmission of torsional vibrations from the crankshaft of the engine to the accessory driven by the crankshaft through an accessory drive belt. It is also known to install isolation devices on the crankshaft itself to reduce the transmission of torsional vibrations into the accessory drive belt itself. It is known that certain accessories, such as the alternator, can cause an isolation device to go into resonance during operation, and it has been found that damping is advantageous in order to inhibit this from occurring. However, further improvements in the performance of isolation devices would be beneficial.

SUMMARY

In an aspect, an isolation device is provided for engagement between an endless drive member for an engine and a shaft of a component in operative engagement with the endless drive member. The isolation device includes a hub, a pulley, an isolation spring and a damping member. The hub is mountable to the shaft of the component. The pulley is rotatable relative to the hub and positioned for engagement with the endless drive member. The isolation spring is a helical torsion spring that is positioned to transfer torque along a torque path between the hub and the pulley. The isolation spring has a first spring end positioned to engage a first spring end engagement feature along the torque path, a second spring end positioned to engage a first spring end engagement feature along the torque path, and a plurality of helical coils between the first and second spring ends. The damping member is fixed rotationally relative to one of the hub and the pulley and is engageable frictionally with the other of the hub and the pulley and is positioned radially between the isolation spring and the other of the hub and the pulley. The damping member has a first angular end and a second angular end and has a selected angular length between the first and second angular ends. Torque transmission through the isolation spring below a selected non-zero torque, irrespective of hub load on the pulley, drives a change in radius of the helical coils that is sufficiently small that the isolation spring avoids applying a radial force to press the damping member against said other of the hub and the pulley. Torque transmission through the isolation spring above the selected non-zero torque, irrespective of hub load on the pulley, drives a change in radius of the helical coils that is sufficiently large that the isolation spring applies a radial force to press the damping member against said other of the hub and the pulley so as to generate frictional damping. As torque transmission through the isolation spring increases, irrespective of hub load on the pulley, beyond the selected non-zero torque, the radial force to press the damping member against said other of the hub and the pulley increases, so as to generate increasing frictional damping.

In another aspect, a method is provided for operating an isolation device between an endless drive member for an engine and a shaft of a component in operative engagement with the endless drive member, wherein the isolation device includes a hub, a pulley, an isolation spring and a damping member a damping member that is fixed rotationally relative to one of the hub and the pulley and is engageable frictionally with the other of the hub and the pulley, the method comprising:

mounting the hub to the shaft of the component;
engaging the pulley with the endless drive member;
transmitting torque between the hub and the pulley through the isolation spring;
wherein torque transmission through the isolation spring below a selected non-zero torque, irrespective of hub load on the pulley, drives the isolation spring to move but to avoid pressing the damping member against said other of the hub and the pulley, and
wherein torque transmission through the isolation spring above the selected non-zero torque, irrespective of hub load on the pulley, drives the isolation spring to press the damping member against said other of the hub and the pulley so as to generate frictional damping,
wherein, as torque transmission through the isolation spring increases, irrespective of hub load on the pulley, beyond the selected non-zero torque, a force with which the isolation spring presses the damping member against said other of the hub and the pulley increases, so as to generate increasing frictional damping.

BRIEF DESCRIPTION OF THE DRAWINGS

The foregoing and other aspects will now be described by way of example only with reference to the attached drawings, in which.

DETAILED DESCRIPTION OF EXAMPLE EMBODIMENTS

Figure 1:
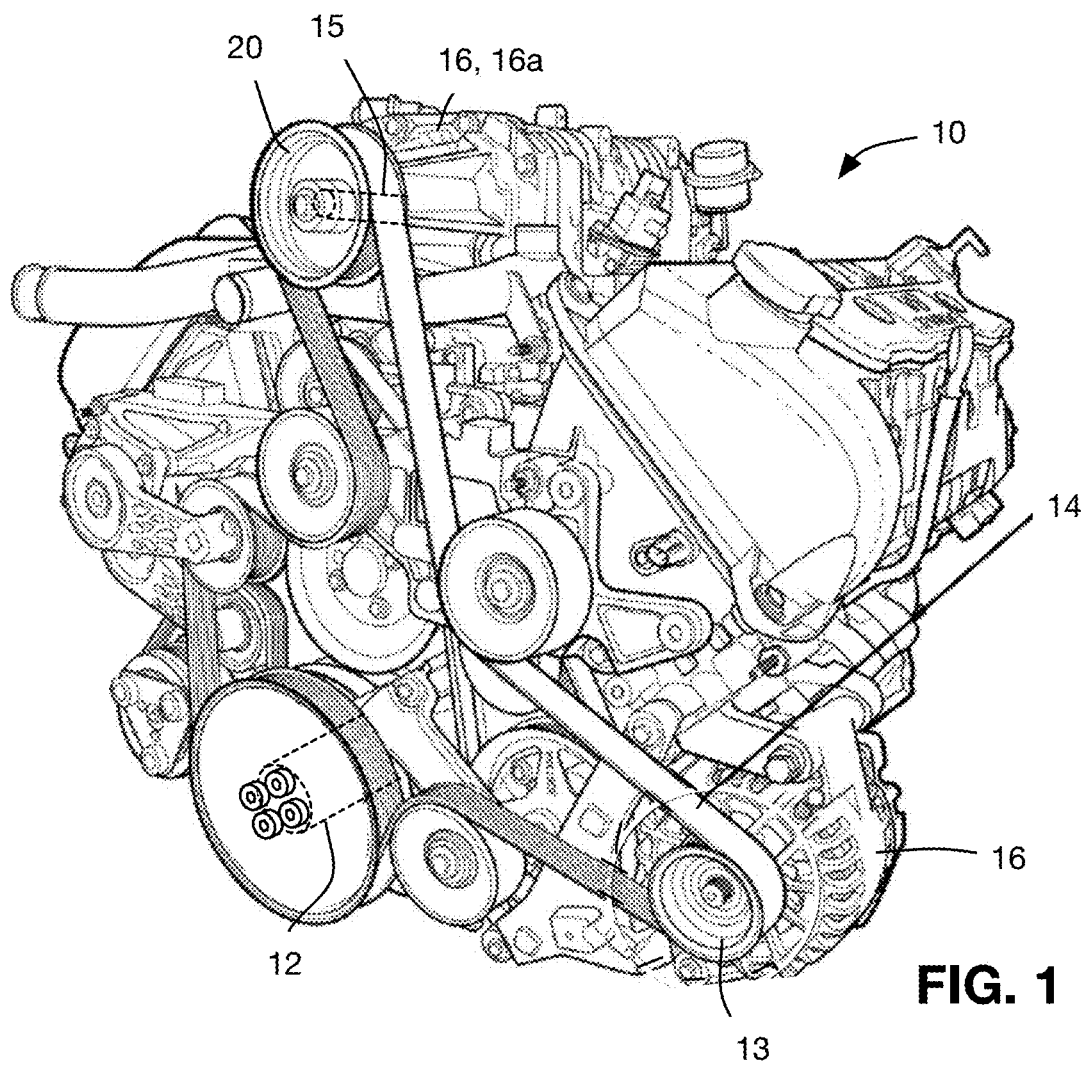
FIG. 1 is a perspective view of an engine in a vehicle containing an isolation device, in accordance with an embodiment of the present invention.

Reference is made to FIG. 1, which shows an engine 10 for a vehicle. The engine 10 includes a crankshaft 12 which drives an endless drive member 14, which may be, for example, a belt. The endless drive member 14 may be referred to in the present disclosure as the belt 14 for greater readability, however it will be understood that it could alternatively be any other suitable type of endless drive member. Via the belt 14, the engine 10 drives a plurality of accessories 16, such as an alternator, which is identified at 16a. Each accessory 16 includes an input drive shaft 15 with a pulley 13 thereon, which is driven by the belt 14. An isolation device 20 is provided instead of a pulley, between the belt 14 and the input shaft 15 of any one or more of the belt driven accessories 16.

The isolation device 20 permits the transfer of torque from the belt 14 to the alternator 16a, while isolating the alternator from torsional vibrations that are transmitted into the belt 14 from the crankshaft 12. The isolation device 20 provides damping that is dependent on the amount of torque being transferred between the belt 14 and the shaft 15 and that is very low or substantially zero for torques below a selected torque value.

Figure 2:
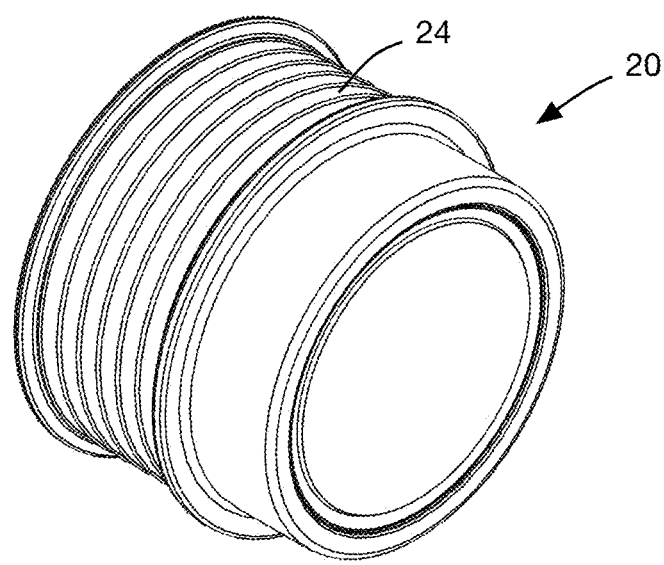
FIG. 2 is a perspective view of the isolation device shown in FIG. 1.

The isolation device 20 is shown in perspective view in FIG. 2. The isolation device 20 may be any suitable type of isolation device, such as an isolator, or a decoupler. In the present example, the isolation device is a decoupler and reference to the 'decoupler 20' may be made throughout the present disclosure, for greater readability. However, it will be understood by one skilled in the art that the decoupler 20 could alternatively be any other suitable type of isolation device, such as an isolator that is not equipped with a one-way overrunning clutch.

Figure 3:
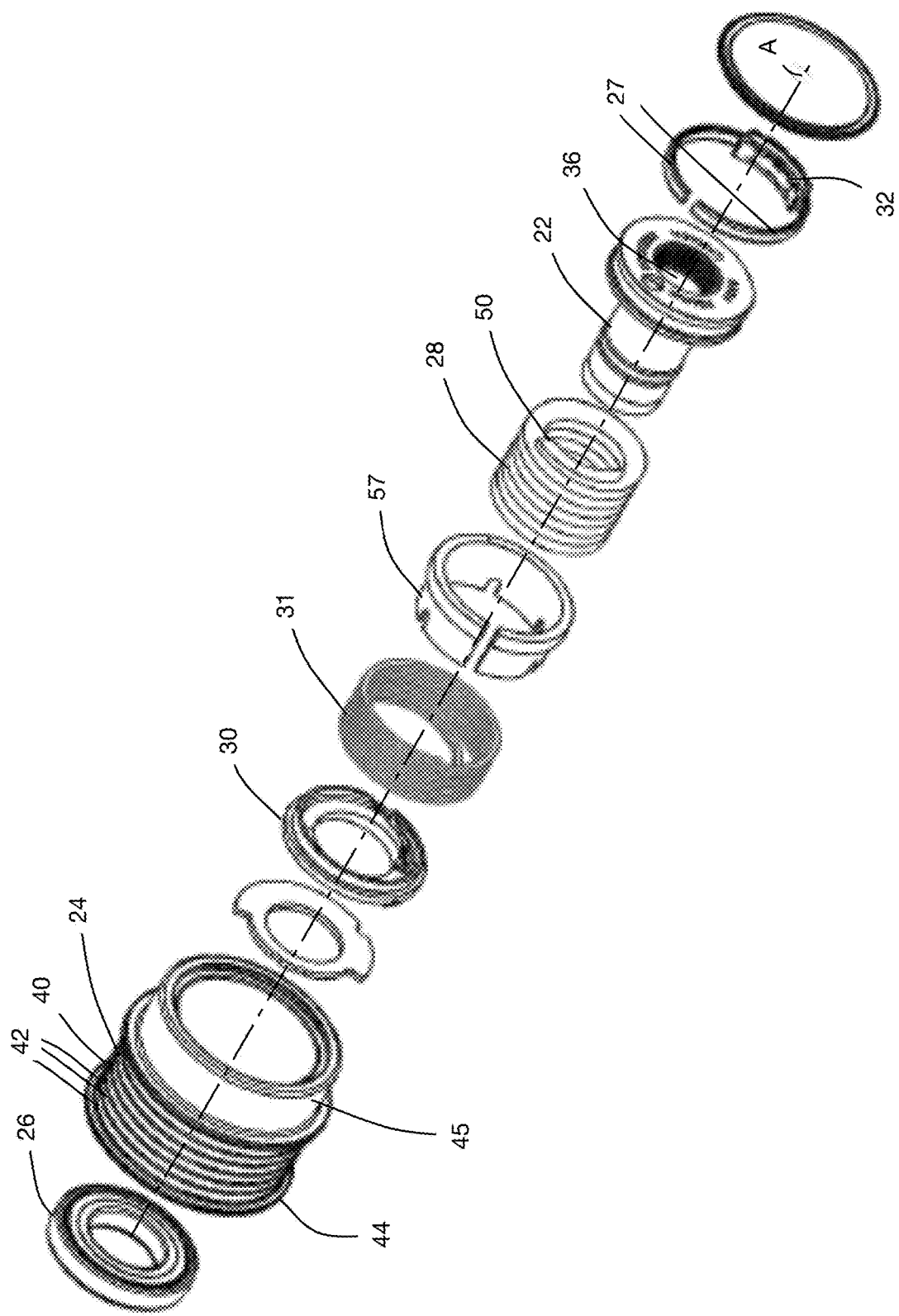
FIG. 3 is a perspective exploded view of the isolation device shown in FIG. 1.
Figure 4:
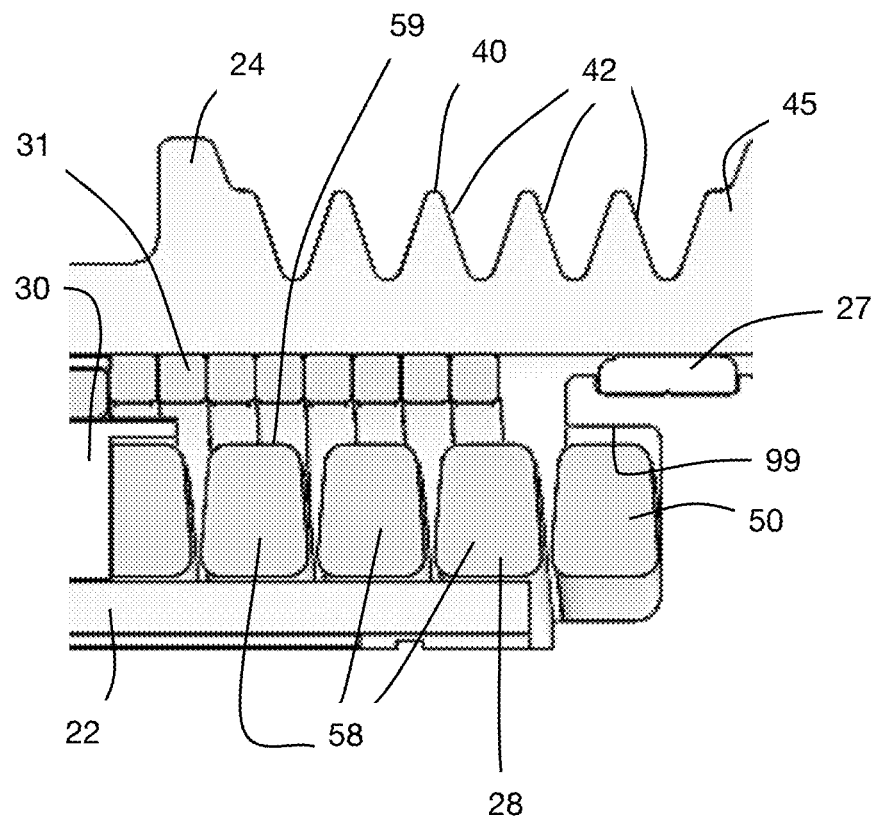
FIG. 4 is a sectional view of a portion of the isolation device shown in FIG. 1.

Reference is made to FIG. 3 which shows an exploded view of the decoupler 20 and FIG. 4 which shows a sectional view of a portion of the decoupler 20. The decoupler 20 includes a hub 22, a pulley 24, a first bearing member 26, a second bearing member 27, an isolation spring 28, a carrier 30, a one-way clutch 31 and a damping member 32.

The hub 22 is mountable to the accessory shaft (e.g. the alternator shaft 15a in FIG. 1) in any suitable way. For example, the hub 22 may have a shaft-mounting aperture 36 (FIG. 4) therethrough that is used for the mounting of the hub 22 to the end of the alternator shaft 15, for co-rotation of the hub 22 and the alternator shaft 15.

The pulley 24 is rotatable relative to the hub 22. The pulley 24 has an outer surface 40 which is configured for engagement with the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43 which is described further below. The pulley 24 may be made from any suitable material, such as a steel, or aluminum, or in some cases a polymeric material, such as certain types of nylon, phenolic or other materials.

The first bearing member 26 rotatably supports the pulley 24 on the hub 22 at a first (proximal) axial end 44 of the pulley 24. The first bearing member 26 may be a bearing (e.g. a ball bearing) or a bushing.

The second bearing member 27 also rotatably supports the pulley 24 on the hub 22, but at a second (distal) axial end 45 of the pulley 24. In the example shown the second bearing member is made up of bushing projections that extend out from the damping member 32.

The isolation spring 28 is provided to accommodate oscillations in the speed of the belt 14 relative to the alternator shaft 15a, which result from torsional vibrations. The isolation spring 28 in the embodiment shown is a helical torsion spring that has a first helical end 50 that is held in an annular slot 51 (FIG. 5A) and that abuts a first spring end engagement feature 52 (FIG. 5A), which is in the example shown, a radially extending driver wall on the hub 22. The isolation spring 28 has a second helical end 53 (FIG. 3) that engages a second spring end engagement feature 54 (which may also be a radially extending driver wall) on the carrier 30. In the embodiment shown, the isolation spring 28 has a plurality of coils 58 between the first and second ends 50 and 53, and has a radially outer surface 59. The coils 58 are preferably spaced apart by a selected amount and the isolation spring 28 is preferably under a selected amount of axial compression to ensure that the first and second helical ends 50 and 53 of the spring 28 are abutted with the respective walls on the carrier 30 and hub 22. An example of a suitable engagement between the isolation spring 28, the hub 22 and the carrier 30 is shown and described in U.S. Pat. No. 7,712,592, the contents of which are incorporated herein by reference. A thrust plate 73 may be provided to receive the axial thrust force of the carrier 30 resulting from the axial compression of the spring 28.

The isolation spring 28 may be made from any suitable material, such as a suitable spring steel. The isolation spring 28 may have any suitable cross-sectional shape. In the figures, the isolation spring 28 is shown as having a generally rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

The one-way clutch 31 may be any suitable type of one-way clutch such as a wrap spring clutch. For readability the one-way clutch 31 may be referred to herein as the 'wrap spring clutch 31', but it will be understood that the one-way clutch 31 could be any other suitable type of one-way clutch.

When actuated, the wrap spring clutch 31 expands radially to engage the inner surface 43 in order to couple the pulley 24 and hub 22 together.

The wrap spring clutch 31 has a first end 60 that is engaged in a slot in the carrier 30 so as to fixedly connect the first end 60 to the carrier 30 in engagement with a radially-extending clutch drive wall 62 on the carrier 30. The wrap spring clutch 31 has a second end 64 that may be free floating, and has a plurality of coils 66 between the first 60 and second ends 64.

The carrier 30 may be made from any suitable material such as, for example, a suitable nylon or the like. The carrier provides an operative connection between the isolation spring 28 and the wrap spring clutch 31 for torque transmission therebetween, as is known in the art.

When a torque is applied from the belt 14 to the pulley 24 to drive the pulley 24 at a speed that is faster than that of the shaft 15, friction between the inner surface 43 of the pulley 24 and the coils of the wrap spring clutch 31 drives at least one of the coils of the wrap spring clutch 31 at least some angle in a first rotational direction about the axis A, relative to the first end 60 of the wrap spring clutch 31. The relative movement between the one or more coils driven by the pulley 24 relative to the first end 50 causes the clutch spring to expand radially, which further strengthens the grip between the coils of the wrap spring clutch 31 and the inner surface 43 of the pulley 24. As a result, the first end 60 of the wrap spring clutch 31 transmits the torque from the pulley to the carrier 30. The carrier 30 transmits the torque into the isolation spring 28. The isolation spring 28 transmits torque from the carrier 30 into the hub 22. As a result, the hub 22 is brought up to the speed of the pulley 24. Thus, when the pulley 24 rotates faster than the hub 22, the wrap spring clutch 31 operatively connects the pulley 24 to the carrier 30 and therefore to the hub 22.

Torque transfer through the isolation spring 28 drives a change in radius of the helical coils 58. In the example shown, the isolation spring 28 expands radially during torque transfer therethrough.

As shown in FIG. 3 but not in FIG. 4, an optional torque limiter sleeve 68 may be provided to limit the amount of radial expansion that the isolation spring 28 can incur. The torque limiter sleeve 68 is, in the embodiment shown, a helical member itself, although it could have any other suitable configuration such as a hollow cylindrical shape. An example of a hollow cylindrical sleeve is shown in FIG. 3. By limiting the amount of room available for radial expansion of the isolation spring 28 (in embodiments wherein the isolation spring 28 is a torsion spring) the sleeve 68 acts as a torque limiter. Thus, when a torque is provided by the pulley 24 that exceeds a selected torque limit, the isolation spring 28 expands until the isolation spring 28 is constrained by the sleeve 57. An example of a suitable sleeve 68 is shown and described in U.S. Pat. No. 7,766,774, the contents of which are hereby incorporated by reference.

The damping member 32 is fixed rotationally relative to one of the hub 22 and the pulley 24 and is engageable frictionally with the other of the hub 22 and the pulley 24, and is positioned radially between the isolation spring 28 and said other of the hub 22 and the pulley 24. In the example shown, the damping member 32 is positioned radially between the isolation spring 28 and the pulley 24, and is fixed rotationally relative to the hub 22. More specifically, the damping member 32 sits in a window 33 in an outer wall 99 of the hub 22 that in part defines the slot 51.

Figure 5:
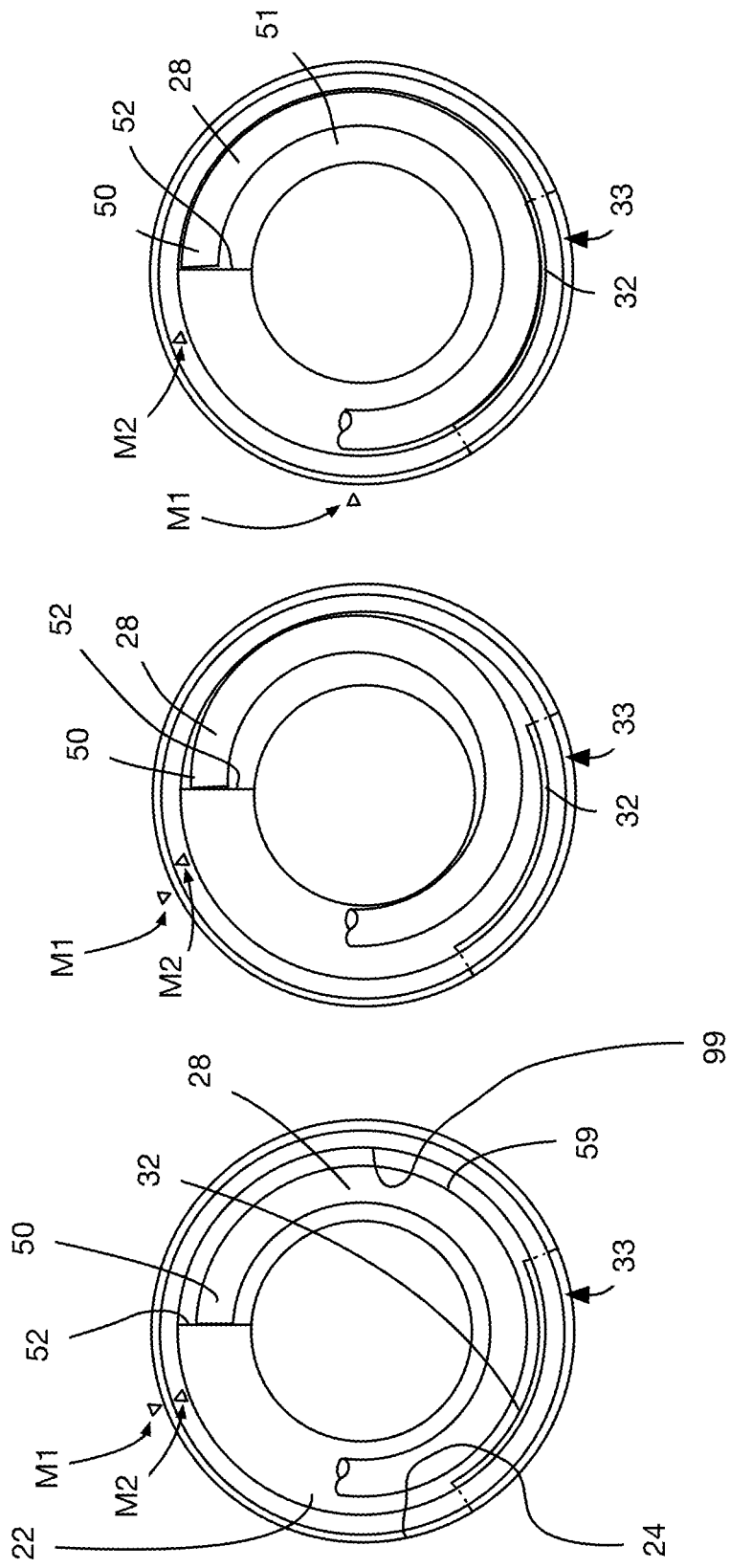
FIG. 5A is a sectional plan view of the isolation device shown in FIG. 1 while at rest.
FIG. 5B is a sectional plan view of the isolation device shown in FIG. 1 while transferring a first amount of torque below a selected threshold value.
FIG. 5C is a sectional plan view of the isolation device shown in FIG. 1 while transferring a first amount of torque above a selected threshold value.

The damping member 32 has a first angular end 70 and a second angular end 72 and has a selected angular length LD between the first and second angular ends 70 and 72, as shown in FIG. 5A. In the example shown in the damping member 32 has an angular length of about 84 degrees.

Torque transmission through the isolation spring 28 below a selected non-zero torque, irrespective of hub load on the pulley 24, drives a change in radius of the helical coils 58 that is sufficiently small that the isolation spring 28 avoids applying a radial force to press the damping member against said other of the hub and the pulley 24, as shown in FIG. 5B. Torque transmission through the isolation spring 28 above the selected non-zero torque, irrespective of hub load on the pulley 24, drives a change in radius of the helical coils 58 that is sufficiently large that the isolation spring 28 applies a radial force to press the damping member 32 against said other of the hub 22 and the pulley 24 so as to generate frictional damping, as shown in FIG. 5C. As torque transmission through the isolation spring increases, irrespective of hub load on the pulley 24, beyond the selected non-zero torque, the radial force to press the damping member 32 against said other of the hub 22 and the pulley 24 increases, so as to generate increasing frictional damping.

Markers on the pulley 24 and hub 22 are shown at M1 and M2, respectively, so that the relative rotational positions of the pulley 24 and hub 22 can be seen in FIGS. 5A-5C.

Based on the above the position of the damping member 32 relative to the first spring end 50 of the isolation spring 28 determines the amount of torque that is transferred between the pulley 24 and the hub 22 before any damping occurs through the damping member 32. It has been found that the initial contact of the isolation spring 28 with the wall of the slot of the hub 22 occurs at 118 degrees from the first end 50 of the isolation spring 28, or alternatively worded, from the first spring end engagement feature 52. The wall of the slot 51 in the hub 22 is shown at 99. In the embodiment in which the damping member 32 has a length of 84 degrees, as long as the damping member 32 is positioned with its centre between 90 and 160 degrees, engagement of the isolation spring 28 with the damping member 32 will occur at 118 degrees from the first spring end 50. If the damping member 32 is positioned with its centre greater than 160 degrees from the first spring end 50, then the first end 70 of the damping member 32 is positioned farther than 118 degrees from the first spring end 50. Accordingly, the isolation spring 28 will engage the wall of the hub 22 and some portion of the isolation spring 28 will engage the first end 70 of the damping member 32. However, because some portion of the isolation spring is also engaged with the wall of the hub 22, the force of engagement of the isolation spring 28 on the damping member 32 is lower than if the damping member 32 were positioned within 118 degrees of the first spring end 50. As the damping member 32 is positioned farther and farther from the first end 50 of the spring 28, the force on the damping member initially applied by the spring 28 is lower and lower. The force on the damping member 32 is directly related to the friction force (i.e. the damping force) that is present between the damping member 32 and the pulley surface. Accordingly, the position of the damping member 32 directly controls the damping force that is generated between the pulley 24 and the hub 22.

Figure 6:
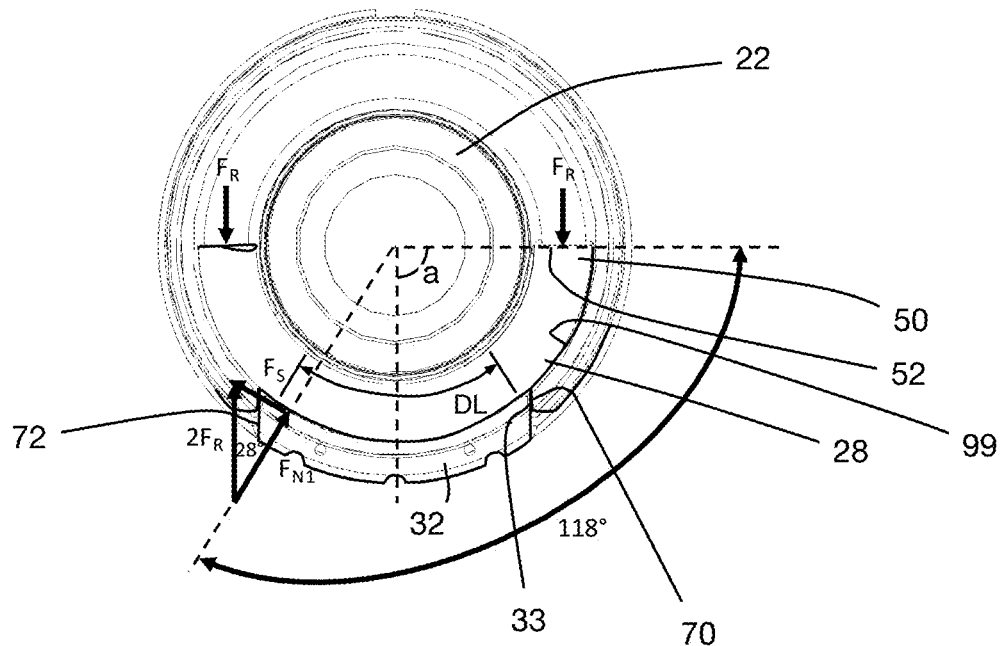
FIG. 6 is a sectional plan view of the isolation device shown in FIG. 1 with a damping member is a first position, showing forces acting on an isolation spring of the isolation device.
Figure 7:
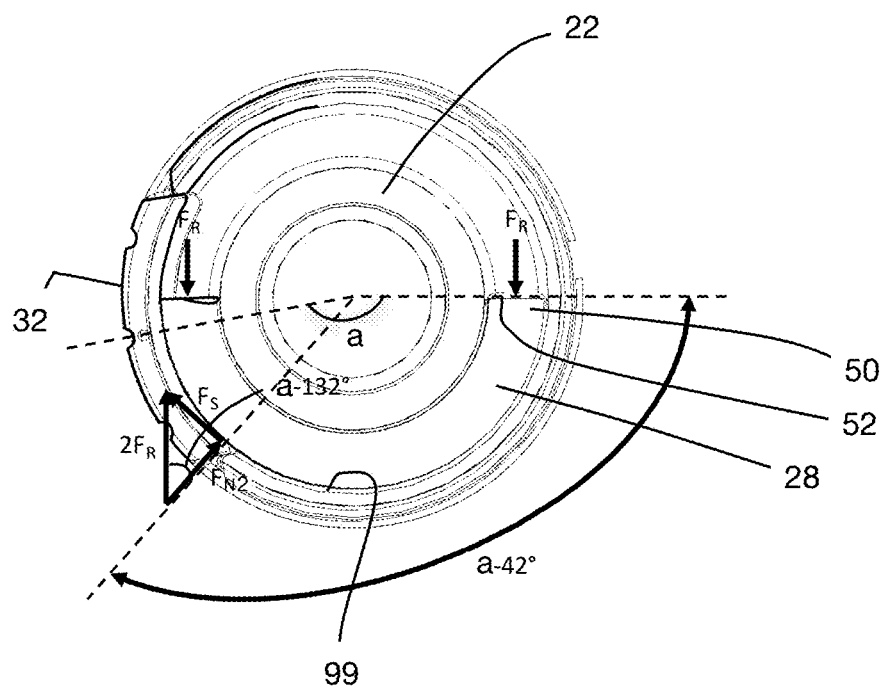
FIG. 7 is a sectional plan view of the isolation device shown in FIG. 1 with a damping member is a second position, showing forces acting on an isolation spring of the isolation device.

Reference is made to FIGS. 6 and 7. Calculations are provided below to determine relationships between the normal force applied to the damping member 32 by the surface against which it is engaged (wherein the normal force is shown as FN1), and the force between the isolation spring 28 and the hub 22 (wherein this force is shown as FR). The force FR is related to the torque being transferred between the pulley 24 and the hub 22. The normal force FN1 is related, as mentioned above, to the damping force applied between the pulley 24 and the hub 22.

As can be seen, if we take point on the isolation spring 180 degrees away from the first spring end 50, a force FR will be applied on the first spring end 50 and a force FR will be applied on the portion of the spring 28 shown. In FIG. 6, the damping member 32 is positioned within the range of 90 degrees to 160 degrees inclusive, so as to be directly engaged by the isolation spring 28 upon torque transfer through the decoupler 20. In the specific example shown in FIG. 6, the damping member has its centre position at 90 degrees. The angular distance of the first spring end 50 to the centre of the damping member 32 may be shown at a. Based on the angle of engagement of 118 degrees, the normal force FN1 is applied at an angle of 28 degrees from the direction line of the forces FR. Assuming equilibrium, the normal force FN1 and a supplementary force FS must sum as vectors to a resultant force that is 2FR so as to cancel the two forces FR on the first end 50 of the spring and on the point 180 degrees away from the first end 50. Put mathematically, it can be seen that:

2FRcos28=FN1.

Therefore, $$FR = \frac{FN1}{2\cos 28}.$$

In FIG. 7, the damping member 32 is positioned greater than 160 degrees and less than or equal to 220 degrees from the first spring end 50. In FIG. 7, the engagement of the spring 28 with the damping member will occur at the first end 70 of the damping member 32 and not at 118 degrees. The engagement will occur at a-42 degrees (in the present embodiment where the damping member is 84 degrees in angular length). The angle between the normal force (shown as FN2) and the direction lines of the forces FR (which remain the same as the forces FR in FIG. 6 for comparison purposes), is a-132 degrees. The relationship between the forces can be expressed as:

2FRcos(a-132)=FN2.

Using the formula above relating to FR in FIG. 6, it can be seen that:

$$FN2 = \frac{FN1\cos(a-132)}{\cos 28}$$

As will be understood from this last relationship, when a=160 degrees, FN2=FN1. When a is greater than 160 degrees but less than or equal to 220 degrees, FN2 is less than FN1.

Figure 8:
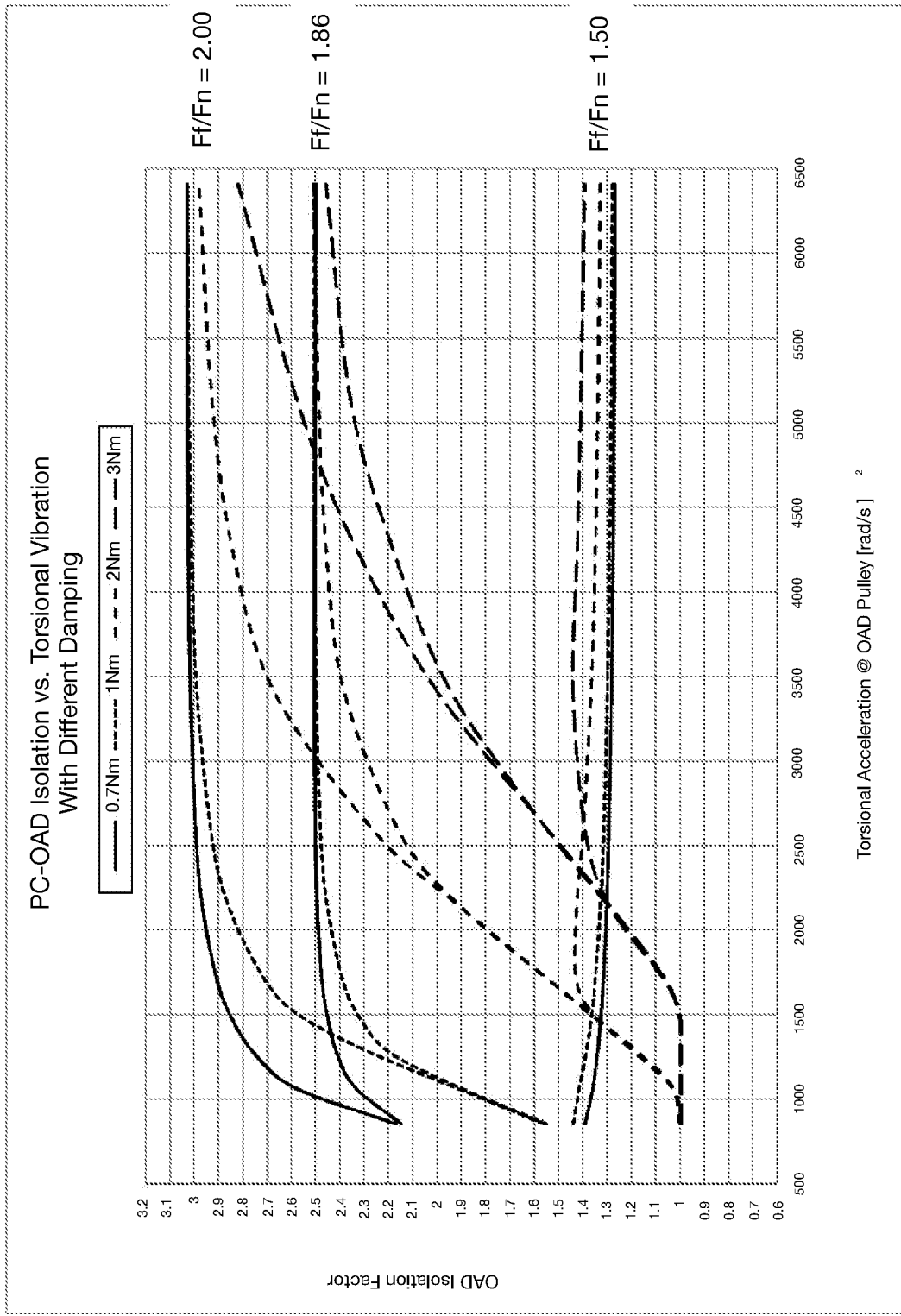
FIG. 8 is a graph illustrating torsional accelerations and damping factors for an engine at different torque transfer values.

It is important to note that, damping results in a reduction in the amount of isolation that occurs between the pulley 24 and the hub 22, since torque is being transferred directly between the pulley and hub without going through the isolation spring. The amount of damping that is needed in an isolation device varies significantly with the specifics of the engine to which the isolation device 20 is being used. It is beneficial to avoid a situation where an engine is over-damped, and therefore does not have enough isolation as would be desired. FIG. 8 shows a graph of the isolation factor of the decoupler 20 relative to torsional acceleration on the pulley 24, with varying torques being applied and varying values of Ff/FN (where Ff is the force of friction (i.e. the damping force) and FN as noted above is the normal force on the damping member 32).

Figure 9A:
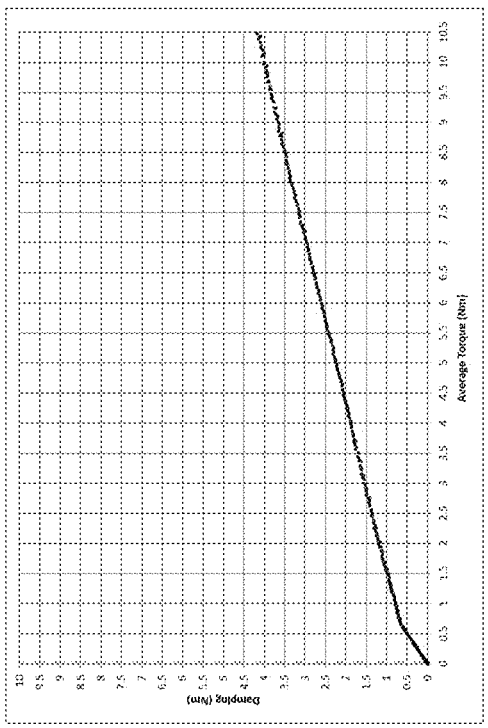
FIGS. 9A and 9B are graphs representing torque curves for the isolation device shown in FIG. 1, with the damping member in two different positions.
Figure 9B:
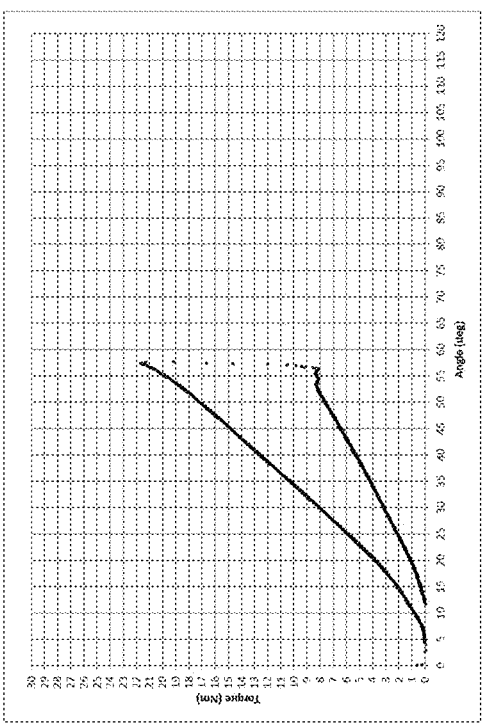

FIGS. 9A and 9B illustrate the amount of damping torque that occurs for two different positions of the damping member. FIG. 9A represents the damping torque when the damping member 32 is within the range of 90 to 160 degrees. FIG. 9B represents the damping torque when the damping member 32 is at 200 degrees. It will be understood in general that, when the position of the damping member 32 is given in degrees, it is intended to mean the number of degrees from the first end 50 of the isolation spring 28.

Figure 10A:
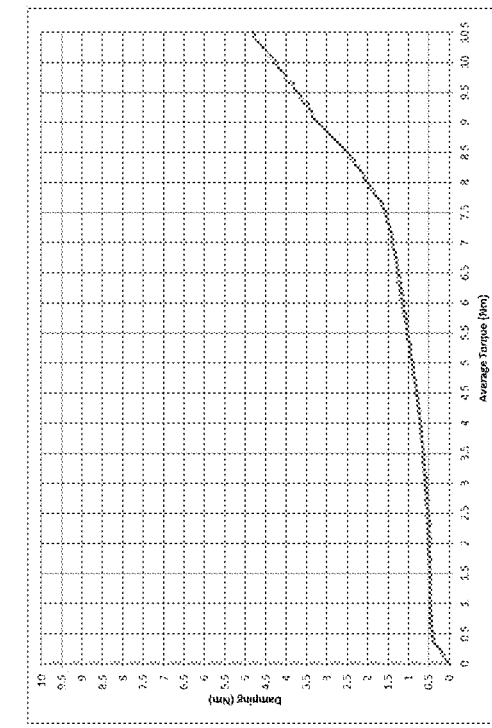
FIGS. 10A and 10B are graphs showing average torque curves for the isolation device shown in FIG. 1, with the damping member in the two different positions.
Figure 10B:
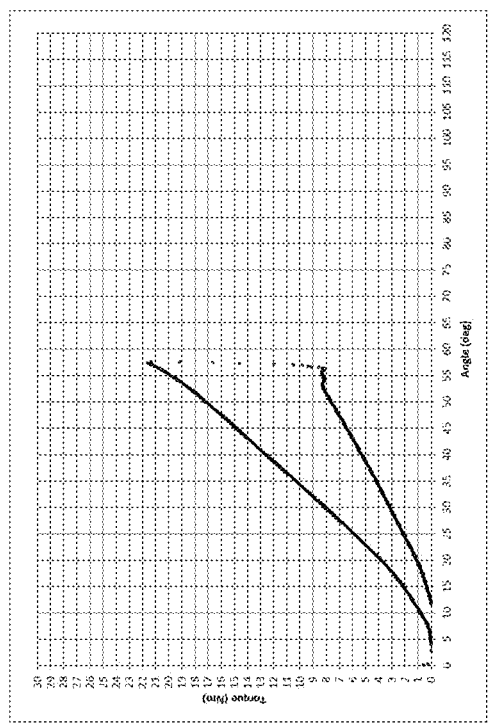
Figure 11:
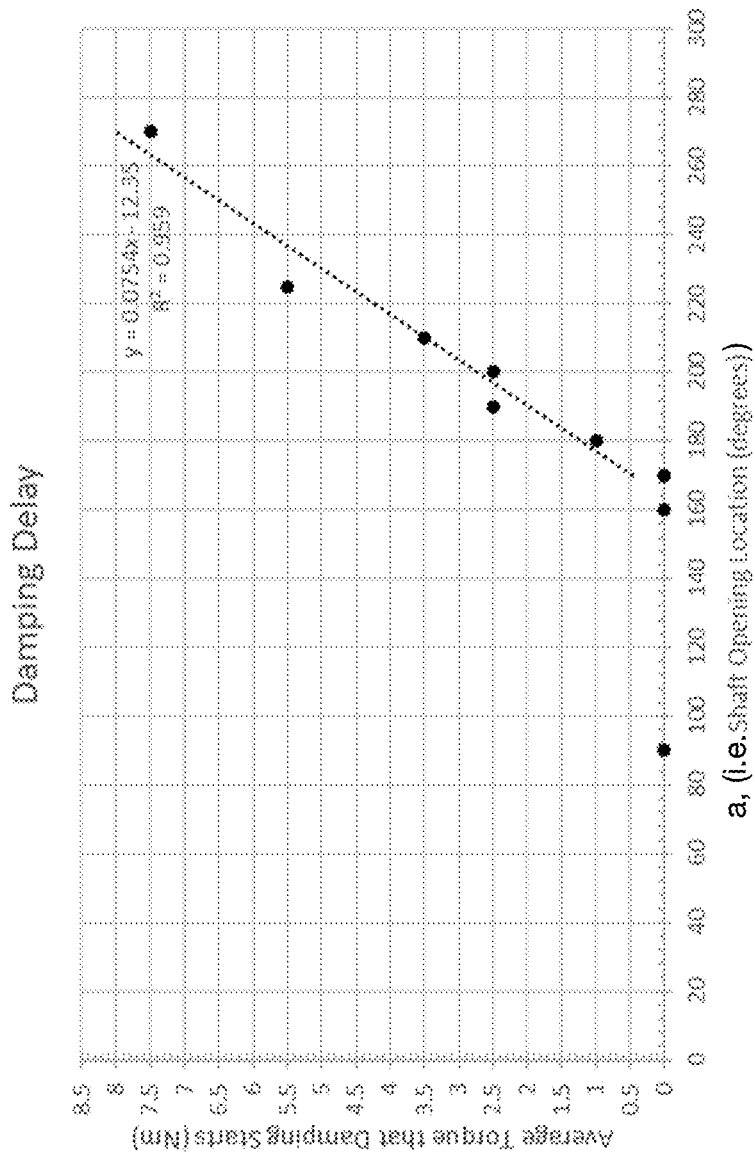
FIG. 11 is a graph showing the average torque at which damping starts to occur, based on the position of the damping member.

The distance between the upper curve and the lower curve in each of FIGS. 9A and 9B is the damping torque. As can be seen, there is relatively little damping that occurs during torque transfer below a certain amount for the decoupler 20 represented in FIG. 9B, whereas the damping torque is larger for the decoupler 20 shown in FIG. 9A. Beyond the selected amount of torque transfer, there is increasing damping that occurs in the decoupler 20 represented in FIG. 9B and so the upper and lower curves diverge from one another. FIGS. 10A and 10B are graphs of the average torque transferred between the pulley 24 and the hub 22 for the decouplers 20 represented in FIGS. 9A and 9B respectively. As can be seen, there is relatively little torque transfer that takes place up to a certain amount of torque for the decoupler 20 represented in FIG. 10B as compared to the amount of torque being transferred in FIG. 10A. FIG. 11 shows the relationship between the torque transfer at which damping begins in relation to the position of the damping member 32. As can be seen, when the angle a of the centre of the damping member 32 is less than or equal to 160 degrees, the torque at which some damping occurs is zero. In other words, some damping occurs at all torques. However, when the angle a is greater than 160 degrees the torque upon which damping starts increases generally linearly.

It will be understood that, while the isolation device 20 may be a decoupler, it could alternatively be an isolator, that lacks a one-way clutch. Furthermore, while the one-way clutch shown is a wrap spring clutch, it could alternatively be any other type of one way clutch such as a roller clutch. In the embodiment shown, the wrap spring clutch 31 is radially outside the isolation spring 28, however, in alternative embodiments it could be radially inside the isolation spring 28.

While it has been shown for the isolation spring 28 to expand radially against the damping member during torque transfer, it is alternatively possible to provide an embodiment in which the isolation spring contracts radially during torque transfer, and wherein the damping member is positioned inside of the isolation spring 28. In such an embodiment, the isolation spring 28 preferably includes spring tangs that engage apertures in the hub and the carrier.

Figure 12:
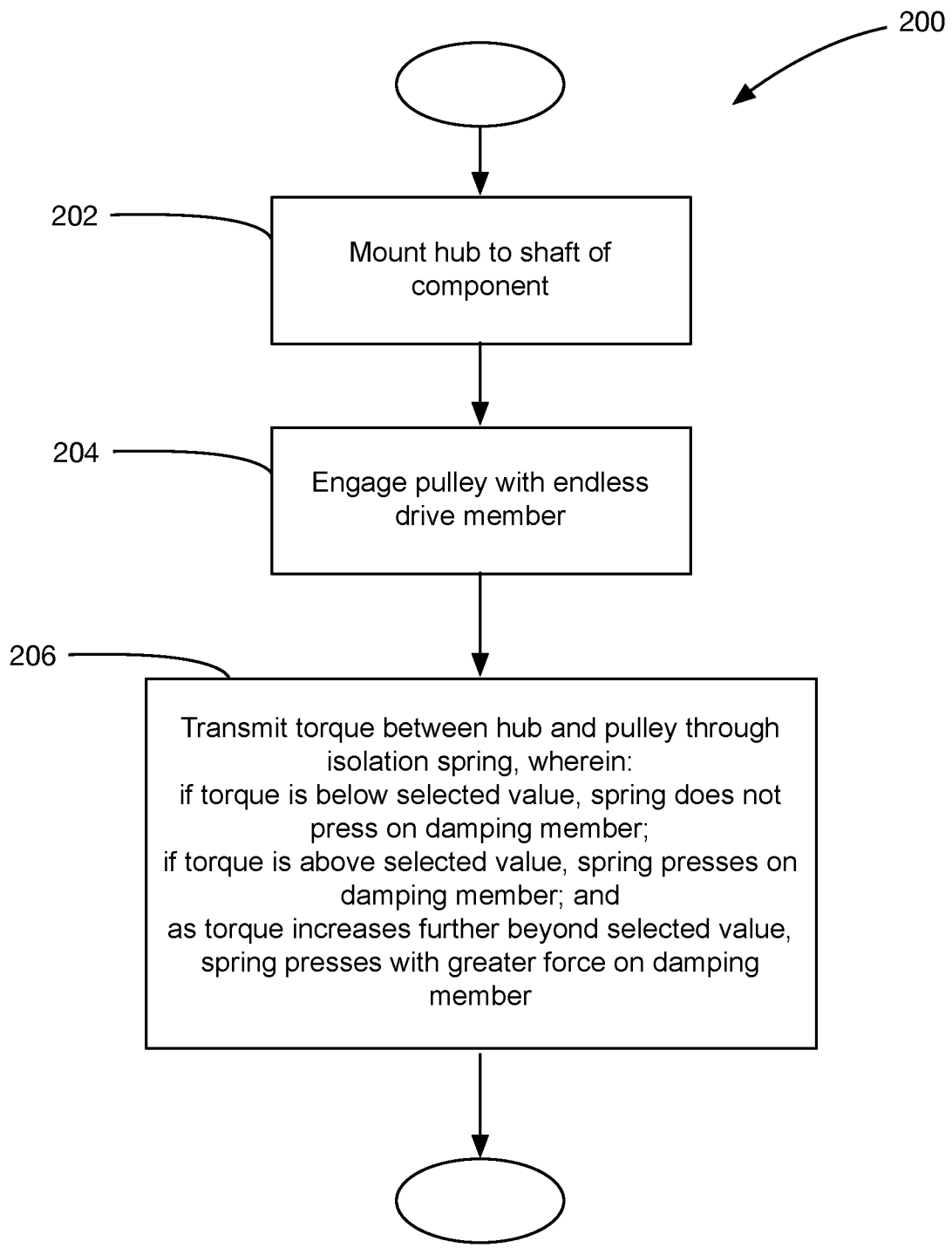
FIG. 12 is a flow diagram illustrating a method for operating an isolation device.

Reference is made to FIG. 12, which is a flow diagram illustrating a method 200 of operating an isolation device (e.g. decoupler 20) between an endless drive member (e.g. belt 14) for an engine (e.g. engine 10) and a shaft of a component (e.g. alternator shaft 15) in operative engagement with the endless drive member, wherein the isolation device includes a hub (e.g. hub 22), a pulley (e.g. pulley 24), an isolation spring (e.g. isolation spring 28) and a damping member (e.g. damping member 32) that is fixed rotationally relative to one of the hub and the pulley and is engageable frictionally with the other of the hub and the pulley, the method comprising:

mounting the hub to the shaft of the component (step 202)
engaging the pulley with the endless drive member (step 204);
transmitting torque between the hub and the pulley through the isolation spring (step 206);

wherein torque transmission through the isolation spring below a selected non-zero torque, irrespective of hub load on the pulley, drives the isolation spring to move but to avoid pressing the damping member against said other of the hub and the pulley, and wherein torque transmission through the isolation spring above the selected non-zero torque, irrespective of hub load on the pulley, drives the isolation spring to press the damping member against said other of the hub and the pulley so as to generate frictional damping, wherein, as torque transmission through the isolation spring increases, irrespective of hub load on the pulley, beyond the selected non-zero torque, a force with which the isolation spring presses the damping member against said other of the hub and the pulley increases, so as to generate increasing frictional damping.

In some embodiments, the method further includes providing a one-way clutch that permits rotation of one of the pulley and the hub relative to the other of the pulley and the hub in a first rotational direction but prevents rotation of said one of the pulley and the hub relative to said other of the pulley and the hub in the first rotational direction. In some further embodiments, the one-way clutch is radially outside of the isolation spring.

While the above description constitutes a plurality of embodiments of the present invention, it will be appreciated that the present invention is susceptible to further modification and change without departing from the fair meaning of the accompanying claims.

The invention claimed is:

1. An isolation device for engagement between an endless drive member for an engine and a shaft of a component in operative engagement with the endless drive member, comprising:
   a hub that is mountable to the shaft of the component;
   a pulley that is rotatable relative to the hub and positioned for engagement with the endless drive member;
   an isolation spring that is a helical torsion spring that is positioned to transfer torque along a torque path between the hub and the pulley, wherein the isolation spring has a first spring end positioned to engage a first spring end engagement feature along the torque path, a second spring end positioned to engage a first spring end engagement feature along the torque path, and a plurality of helical coils between the first and second spring ends; and
   a damping member that is fixed rotationally relative to one of the hub and the pulley and is engageable frictionally with the other of the hub and the pulley and is positioned radially between the isolation spring and the other of the hub and the pulley, wherein the damping member has a first angular end and a second angular end and has a selected angular length between the first and second angular ends,
   wherein torque transmission through the isolation spring below a selected non-zero torque, irrespective of hub load on the pulley, drives a change in radius of the helical coils that is sufficiently small that the isolation spring avoids applying a radial force to press the damping member against said other of the hub and the pulley, and
   wherein torque transmission through the isolation spring above the selected non-zero torque, irrespective of hub load on the pulley, drives a change in radius of the helical coils that is sufficiently large that the isolation spring applies a radial force to press the damping member against said other of the hub and the pulley so as to generate frictional damping,
   wherein, as torque transmission through the isolation spring increases, irrespective of hub load on the pulley, beyond the selected non-zero torque, the radial force to press the damping member against said other of the hub and the pulley increases, so as to generate increasing frictional damping.

2. An isolation device as claimed in claim 1, further comprising a one-way clutch that permits rotation of one of the pulley and the hub relative to the other of the pulley and the hub in a first rotational direction but prevents rotation of said one of the pulley and the hub relative to said other of the pulley and the hub in the first rotational direction.

3. An isolation device as claimed in claim 2, wherein the one-way clutch is radially outside of the isolation spring.

4. An isolation device as claimed in claim 2, wherein the one-way clutch is radially inside of the isolation spring.

5. An isolation device as claimed in claim 1, wherein the hub defines an isolation member axis and wherein the damping member has a first a bushing projection connected thereto and a second bushing projection connected thereto, wherein the first and second bushing projections extend circumferentially about the isolation device axis and support relative movement between the pulley and the hub.

6. An isolation device as claimed in claim 1, wherein the damping member extends through a window in one of the hub and the pulley.

7. An isolation device as claimed in claim 1, wherein the damping member is fixed relative to the hub and is engageable frictionally with the pulley.

8. An isolation device as claimed in claim 1, wherein the isolation spring expands radially during torque transfer therethrough.

9. A method of operating an isolation device between an endless drive member for an engine and a shaft of a component in operative engagement with the endless drive member, wherein the isolation device includes a hub, a pulley, an isolation spring and a damping member that is fixed rotationally relative to one of the hub and the pulley and is engageable frictionally with the other of the hub and the pulley, the method comprising:
   mounting the hub to the shaft of the component;
   engaging the pulley with the endless drive member;
   transmitting torque between the hub and the pulley through the isolation spring;
   wherein torque transmission through the isolation spring below a selected non-zero torque, irrespective of hub load on the pulley, drives the isolation spring to move but to avoid pressing the damping member against said other of the hub and the pulley, and
   wherein torque transmission through the isolation spring above the selected non-zero torque, irrespective of hub load on the pulley, drives the isolation spring to press the damping member against said other of the hub and the pulley so as to generate frictional damping,
   wherein, as torque transmission through the isolation spring increases, irrespective of hub load on the pulley, beyond the selected non-zero torque, a force with which the isolation spring presses the damping member against said other of the hub and the pulley increases, so as to generate increasing frictional damping.

10. A method as claimed in claim 9, further comprising providing a one-way clutch that permits rotation of one of the pulley and the hub relative to the other of the pulley and the hub in a first rotational direction but prevents rotation of said one of the pulley and the hub relative to said other of the pulley and the hub in the first rotational direction.

11. A method as claimed in claim 10, wherein the one-way clutch is radially outside of the isolation spring.

12. A method as claimed in claim 10, wherein the one-way clutch is radially inside of the isolation spring.

13. A method as claimed in claim 9, wherein the hub defines an isolation member axis and wherein the damping member has a first a bushing projection connected thereto and a second bushing projection connected thereto, wherein the first and second bushing projections extend circumferentially about the isolation device axis and support relative movement between the pulley and the hub.

14. A method as claimed in claim 9, wherein the damping member extends through a window in one of the hub and the pulley.

15. A method as claimed in claim 9, wherein the damping member is fixed relative to the hub and is engageable frictionally with the pulley.

16. A method as claimed in claim 9, wherein the isolation spring expands radially during torque transfer therethrough.

\* \* \* \* \*